United States Patent
Deak et al.

(10) Patent No.: US 10,563,086 B2
(45) Date of Patent: *Feb. 18, 2020

(54) SOLVENT-BASED LOW TEMPERATURE HEAT SEAL COATING

(71) Applicant: Bostik, Inc., Wauwatosa, WI (US)

(72) Inventors: Darius K. Deak, Haverhill, MA (US); Thomas L. Ruppert, Sussex, WI (US); Elaine Lo, Milford, CT (US)

(73) Assignee: Bostik, Inc., Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,928

(22) Filed: Mar. 27, 2017

(65) Prior Publication Data

US 2017/0198171 A1   Jul. 13, 2017

Related U.S. Application Data

(63) Continuation of application No. 14/668,586, filed on Mar. 25, 2015, now Pat. No. 9,624,400.

(Continued)

(51) Int. Cl.
*C09D 167/02* (2006.01)
*B05D 3/00* (2006.01)
(Continued)

(52) U.S. Cl.
CPC ........... *C09D 167/02* (2013.01); *B05D 3/007* (2013.01); *B05D 3/142* (2013.01); *C08J 7/047* (2013.01);
(Continued)

(58) Field of Classification Search
CPC .................................................. C09D 167/02
See application file for complete search history.

(56) References Cited

U.S. PATENT DOCUMENTS 4,394,235 A * 7/1983 Brandt ................... C08J 5/18
                                                        204/165
5,284,688 A * 2/1994 Hiatt .................... B31D 1/021
                                                      427/208.8
(Continued)

FOREIGN PATENT DOCUMENTS

EP         2 682 419 A1    8/2014
JP         H0740520        2/1995
(Continued)

OTHER PUBLICATIONS

Sato, S. et al., Effects of Various Liquid Organic Solvents on Solvent-Induced Crystallization of Amorphous Poly(lactic acid) Film, Journal of Applied Polymer Science, Dec. 18, 2012.

*Primary Examiner* — Michael F Pepitone
(74) *Attorney, Agent, or Firm* — Christopher R. Lewis

(57) ABSTRACT

A low temperature heat seal coating solution which contains an amorphous or semi-crystalline polyester or co-polyester resin, tackifier, anti-blocking agent, and solvent. The coating solution can be applied to a packaging web such as a foil or film by converters using conventional methods such as gravure, rod, slot die, or printing process. The heal seal coating can be sealed to itself or another substrate to manufacture food packaging bags or pharmaceutical blister packaging. The heat seal temperature can be as low as 70° C. under conventional equipment and conditions in the industry.

43 Claims, 2 Drawing Sheets

Related U.S. Application Data

(60) Provisional application No. 61/967,802, filed on Mar. 26, 2014.

(51) Int. Cl.
  *B05D 3/14* (2006.01)
  *C08J 7/04* (2020.01)
  *C09D 167/00* (2006.01)

(52) U.S. Cl.
  CPC ......... *C09D 167/00* (2013.01); *C08J 2467/00* (2013.01); *C09J 2467/00* (2013.01); *Y10T 428/24802* (2015.01); *Y10T 428/265* (2015.01); *Y10T 428/31667* (2015.04)

(56) References Cited

U.S. PATENT DOCUMENTS

| | | | |
|---|---|---|---|
| 6,162,890 A | 12/2000 | George et al. | |
| 9,624,400 B2 * | 4/2017 | Deak | C08J 7/047 |
| 2003/0198764 A1 | 10/2003 | Kending | |
| 2010/0112250 A1 | 5/2010 | Shelby et al. | |
| 2010/0297392 A1 * | 11/2010 | Chen | B65D 85/48 |
| | | | 428/141 |
| 2011/0163101 A1 * | 7/2011 | Deng | B32B 27/36 |
| | | | 220/361 |
| 2012/0015020 A1 * | 1/2012 | Pourdeyhimi | A61K 9/5184 |
| | | | 424/422 |
| 2013/0313260 A1 | 11/2013 | Deng | |

FOREIGN PATENT DOCUMENTS

| | | |
|---|---|---|
| JP | H0740520 A | 2/1995 |
| JP | 2003176448 | 6/2003 |
| JP | 2004244494 | 9/2004 |
| JP | 2004244494 A | 9/2004 |
| JP | 2005281421 | 10/2005 |
| JP | 2005281421 A | 10/2005 |
| JP | 2009-126924 | 6/2009 |
| WO | WO 02/059186 A1 | 8/2002 |
| WO | WO 2007/047232 A1 | 4/2007 |
| WO | WO2007/047232 A1 | 4/2007 |
| WO | WO2008008381 | 1/2008 |
| WO | WO 2011/082049 A1 | 7/2011 |

\* cited by examiner

SOLVENT-BASED LOW TEMPERATURE HEAT SEAL COATING

CROSS-REFERENCE TO RELATED APPLICATIONS

This application is a continuation of U.S. patent application Ser. No. 14/668,586, filed on Mar. 25, 2015, now U.S. Pat. No. 9,624,400, which claims the benefit under 35 U.S.C. § 119(e) of U.S. Patent Application No. 61/967,802, filed Mar. 26, 2014.

FIELD OF THE INVENTION

This invention relates to a coated film or foil with a low temperature heat seal capability for food or pharmaceutical packaging applications. More specifically, it is related to a solvent based polyester or co-polyester coating which can be off-line applied to films by converters using traditional coating methods. The coated films can be wound into rolls without blocking and have good adhesion to many different packaging substrates at a low activation temperature.

BACKGROUND

Low temperature heat seal films and foils are used to package food products and consumer goods. In one common application, low temperature heat seal films and foils are run on high speed, form, fill and seal packaging machines. The film or foil is typically coated with the heat seal resin on one surface of the web. As the web is fed through the machine, the film or foil is folded to expose the resin covered surfaces face to face, and then the films are sealed along seams using pressure and heat, for example by pressing the films together between heated platens. In addition, the film can also be heat sealed to different packaging substrates such as food container lidding. The performance of the seal in terms of strength and package integrity is largely a function of the characteristics of the film or foil substrate and the heat seal layer, as well as machine operating conditions such as platen temperature, pressure, and dwell time. Since these films are used in food or pharmaceutical packaging, it is desirable that the heat seal coating, as well as the packaging film or foil, be FDA direct food contact compliance (21CFR 175.320 and/or 21CFR 175.300).

Current technology for low temperature heat seal films includes films with water-based or solvent-based coatings, extrusion coated films and co-extruded polyolefin films. Co-extruded or extrusion coated products typically use films such as low density polyethylene (LDPE), linear low density polyethylene (LLDPE), ultra low linear density polyethylene (ULLDPE), ethylene vinyl acetate (EVA) or ionomer technology. Co-extruded and extrusion coated products require expensive film extrusion equipment to manufacture. Companies making these heat seal films normally sell the films in roll form. The rolls are printed, and then supplied in roll form for use on form, fill and seal packaging machines.

Currently, solvent and water-based coatings typically use polyvinylidene chloride (PVDC), acrylic, or ethylene acrylic acid (EAA) technology. It is important that the heat seal coating anchor securely to the base film or foil in order that the resulting heat seal film or foil exhibits adequate bonding performance and acceptable shelf life. Many of these solvent and water-based coating formulations require priming in order to properly prepare the base film for suitable anchorage of the coating. The need for the priming the base film or foil prior to applying the heat seal coating renders these coatings economically impractical for use by many film converters. An objective of the present invention is to provide a formulated heat seal coating that is suitable for use by converters printing packaging films or foils for the food industry, and to provide such a formulation that does not require priming in order to achieve appropriate anchorage to films and foils commonly used in the food industry. At present, most converters are forced to buy expensive low temperature, heat seal films or foils sold by film suppliers.

Another purpose of the present invention is to provide an effective low-temperature heat seal formulation, which enables converters to affordably coat packaging films or foils with a low temperature heat seal coating. The term "low temperature, heat seal coating" is used herein to refer to a coating that is able to seal onto itself at a temperature as low as 70° C. with bond strength in excess of 300 gli (grams per linear inch) and also can be sealed to other packaging materials at 90-130° C., such as food container lidding and trays.

U.S. Patent Application Publication No. 20070087189 describes a self-priming, water-based, heat seal coating for packaging films. The formulation in the '189 patent application is based on copolymers of ethylene and acrylic or methacrylic acid blended with an aliphatic polyurethane emulsion which serves as an adhesion enhancer. Published data regarding this product shows it to have a narrow processing window and lower bond strengths than the current invention.

U.S. Pat. No. 6,607,823 discloses another water-based copolyester heat seal coating using 1,3-propane diol, isophthalic acid, and a sulfomonomer. The coating solution has 1-30 weight percent solids. The coating can be applied to polyamide, polyolefin, and polyester films using conventional off-line coating processes with corona treatment. The heat seal temperature is between 110-170° C. The dwell time is about 0.5-10 seconds under 20-60 PSI pressure. It has good self seal, about 4 pounds per inch peel value.

U.S. Pat. No. 6,543,208 teaches a food packaging film made of three layers: an inner low melting point polyester sealant layer, a vapor deposited ceramic or metal layer, and an outer side high melting point polyester layer. A food bag is formed by heat sealing the film with the low melting point sealant layer inside. The melting point of the sealant layer is below 160° C. One sealant layer from Eastman Chemical has a melt point as low as 80° C. and another sealant layer has a melting point of 122° C. The heat sealable layer is laminated to the metalized PET film using a laminating adhesive. The food bag is made with a high speed packaging machine. The seal bar temperature is about 180-200° C.

U.S. Pat. No. 8,079,470 discloses a co-extruded PET film with one side having an amorphous polyester heat seal layer and the other side having a polyethylene copolymer heat seal layer. The double side sealable film is heat sealed to the blister packaging containers for CDs and DVDs. The polyethylene copolymer layer has a heat sealing temperature of 65-150° C. under 5-80 psi sealing pressure. However, there is no detailed description of the amorphous polyester heat seal condition.

U.S. Pat. No. 8,389,117 describes a polyester based hot melt adhesive for roll applied labels. The hot melt polyester adhesive used 1,4-cyclohexane dicarboxylic acid, 1,4-cyclohexane dimethanol, triethylene glycol, and diethylene glycol. Tackfier, plasticizer, and nucleator were used to improve adhesion, adjust heat seal temperature, and speed up crystallization process. The molecular weight of the polyester is between 1,000 and 15,000. The melt viscosity of the polyester resin is between 300 and 3,000 centipoise at 150° C.

The shrink label is applied about 80-90° C. and the residence time is between 2 and 20 seconds.

In contrast to the above patents, the present invention is directed to a solvent-based, heat seal coating and its use by film converters. The solvent-based, heat seal coating exhibits strong bond strength over a wide range of processing temperatures including relatively low sealing temperatures and different film substrates.

SUMMARY OF THE INVENTION

In one aspect, the invention is a formulated, solvent-based mixture that is coated onto a web of packaging film or foil, which when dry enables face to face heat sealing at a bonding temperature as low as 70° C. The formulated mixture contains a heat seal resin (e.g. 10-50% by weight) comprising an amorphous or semi-crystalline polyester or co-polyester with a glass transition temperature (Tg, ASTM E1356-08) between −35° C. and 0° C. and a Ring and Ball Softening point (ASTM E28-99) of between 60° C. and 120° C. The mixture also contains anti-block additives (e.g. 0.1 to 20% by weight) and solvent (e.g. 40 to 80% by weight). It is desirable that the mixture also include a tackifying resin (e.g. 0 to 30% by weight). In an exemplary embodiment, the low-temperature heat seal amorphous or semi-crystalline polyester or co-polyester resin is a combination of standard polyester dials, such as ethylene glycol, diethylene glycol, butane diol (1,4-; 1,2-; and 1,3-), neopentyl glycol, 2-methyl-1,3-propane diol, hexane diol, propane diol, trimethylolpropane, cyclohexanedimethanol and diacids such as dimethyl terephthalate, terephthalic acid, isophthalic acid, adipic acid, azelaic acid, sebacic acid, cyclohexanedicarboxylic acid, dodecanoic acid, phthalic anhydride, maleic anhydride, and hydroxycarboxylic acid such as e-caprolactone and polycaprolactone diester with diethylene glycol (CAPA). Such a resin provides consistent seal strength for sealing temperatures as low as 70° C. and up to 130° C. or above. One of the drawbacks of the heat seal films and foils in the prior art is that many exhibit a limited range of processing temperatures. The present invention, however, provides significant seal integrity even at low sealing temperatures, such as 70° C.

The co-polyester monomers used in the low-temperature, heat seal resin are desirably approved for direct food contact. The amorphous or semi-crystalline polyester or co-polyester heat seal resins are soluble in common solvents such as ethyl acetate, methyl ethyl ketone, acetone, dioxalane or toluene. The amorphous or semi-crystalline polyester or co-polyester heat seal resin also provides excellent adhesion to a wide range of substrates including paper, polyester, polypropylene, polyvinyl chloride, nylon films, metal foils, etc. It is important that the solvated blend of heat seal resin and solvent include anti-block additives such as silica, fatty amides, waxes or talc. Without the anti-blocking additives, coated flexible substrates would tend to block when wound into roll form and stored prior to use on a form, fill and seal machine.

Importantly, no primer coating is needed for this low-temperature heat seal coating to adhere to many of the commonly used substrates in the packaging industry, such as biaxially oriented polypropylene (BOPP), biaxially oriented polyethylene terephthalate (BOPET), polylactic acid (PLA), cellulose, etc. Proper anchorage to the substrates can be accomplished by the inclusion of resins that have the ability to adhere to low surface energy substrates. Also, corona discharge treatment of the film is helpful to increase surface energy and improve anchorage.

In another aspect, the invention is directed to a heat seal coated packaging film, paper or foil to which a solvent-based heat seal coating has been applied and dried onto one face of the paper, film or foil. The coating can be applied to cover 100% of the surface or more desirably in a pattern along the eventual locations of the heat seals. The packaging web may be made of various materials including paper, films of polyester, polypropylene, nylon, or polyvinylidene chloride, metal foils, polyvinyl chloride or combinations thereof, etc. The invention is also well suited to use with flexible laminates such as two layer polypropylene in which one layer is metalized and the other layer is reverse printed and adhered to the metalized layer. In such a case, the heat seal coating is applied to the metalized layer. If the film is polypropylene, it is preferred to use corona treated film prior to applying the formulated solvent-based, low-temperature heat seal coating. Normally, the heat seal coating should be applied so that the dry thickness of the coating is at least 1.5 microns.

In practice, converters use the product by supplying a roll of packaging film or foil to a printing press such as a gravure or flexographic printing press. Then, the converter uses the printing press to apply the solvent-based, heat seal coating onto one face of the packaging film or foil. The converter then dries the solvent-based heat seal coating to remove the solvent, for example using a conventional in-line drying systems, thereby leaving a dry solid layer of heat seal coating on the packaging film or foil. The converter then rewinds the coated and dried film or foil into roll form for later use on a form, fill and seal packaging machine. As mentioned, it may be necessary to treat packaging film via corona discharge prior to applying the solvent-based heat seal coating in order to assure adequate anchorage of the dry coating to the packaging film.

Other features and advantages of the invention may be apparent to those skilled in the art upon reviewing the following drawings and description thereof.

DETAILED DESCRIPTION OF THE INVENTION

Figure 1:
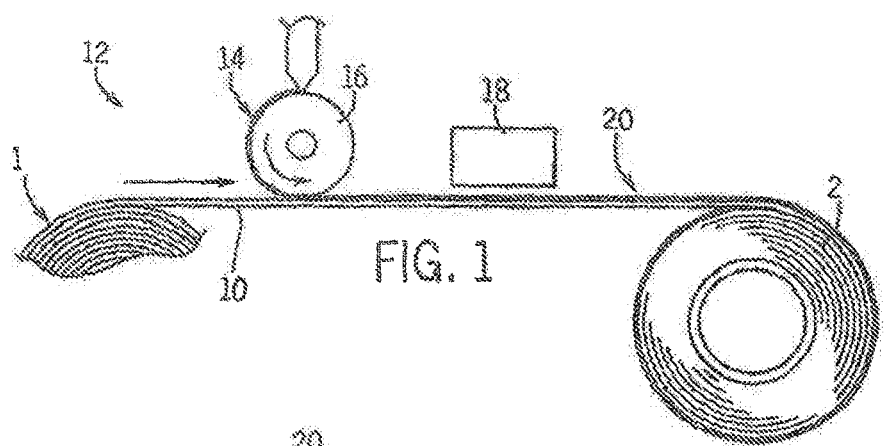
FIG. 1 is a schematic drawing illustrating the application of a low-temperature heat seal coating to a packaging film or foil on a printing press in accordance with an exemplary embodiment of the invention.

In the past, some coextruded heat seal resins have been provided as solid resins in granular form. Also, water-based coatings have been supplied and utilized by converters in pails, drums or totes. The heat seal coating formulation described herein is a solvent-based coating intended to be sold to film converters, for example, as a fully formulated adhesive in pails, drums or totes. The heat seal coating is expected to be shipped to converters as a coating solution with commonly used solvents with the expectation that the converter will dilute the mixture to an appropriate percent of solid or viscosity for the converter's coating or printing equipment.

In accordance with the invention, the heat seal coating solution contains the following ingredients:
  a. solvent 40-80% by weight,
  b. heat seal amorphous or semi-crystalline polyester or co-polyester resin 10-50% by weight,
  c. tackifying resin 0-30% by weight, and
  d. anti-block additives comprising 0.1-20% by weight. The anti-block can be any combination of the following: silica, talc, fatty amide and waxes.

The heat seal resin is an amorphous or semi-crystalline polyester or co-polyester with a glass transition temperature (Tg) as measured by ASTM D1356-08 of between −35° C. and 0° C. and a Ring and Ball Softening point as measured by ASTM E28-99 of between 60° C. and 120° C. More preferably, the amorphous or semi-crystalline polyester or co-polyester has a glass transition temperature (Tg) between −30° C. and −5° C. and a Ring and Ball Softening point between 80° C. and 115° C. Amorphous co-polyester resins are those resins which are glassy and transparent. They do not have a definite molecular arrangement as the structure is very randomized and intertwined. Based on the glass transition temperature, they can be either tacky or brittle at room temperature. Amorphous polyester and co-polyester resins do not have any appreciable crystallinity and melting point as determined by DSC or equivalent technique and therefore have an enthalpy of fusion of less than 10 Joules/gram, preferably less than 5 Joules/gram, and most preferably zero Joules/gram.

The semi-crystalline nature of the resin is a beneficial feature in that an amorphous resin with a similar low Tg would be prone to cold flow at room temperature and would tend to creep or flow so that the coating integrity would be compromised as the coated roll is stored. As a result, increased levels of anti-blocking agents would be needed. This in turn can negatively affect the adhesion of the product. The type and amount of the tackifying resins, anti-block additives and other components needs to be carefully balanced with the crystallinity and chemistry of the polymer to achieve the proper level of blocking resistance, adhesion, heat seal temperature, etc. Amorphous and semi-crystalline polyesters and co-polyesters can be used in this invention, but when using semi-crystalline polymers the heat of fusion of the semi-crystalline polymer must be fairly low, i.e. less than 50 Joules/gram, preferably less than 30 Joules/gram, and most preferably less than 25 Joules/gram.

The amorphous and semi-crystalline polyesters and co-polyesters of the present invention are not only low in crystallinity, they also have very long recrystallization rates which can be as long as days or weeks. For this reason, standard DSC methods cannot be used to determine their true crystallinity. For example, ASTM D 3418 is typically used to determine the heat of fusion of various polymers. It is standard practice to heat the sample past its melting point and then cool it to ensure that all samples have the same heat history. However, the amorphous and semi-crystalline polyesters and co-polyesters used in the current invention will not recrystallize that quickly and will typically exhibit a lower value for heat of fusion on the second heating than the first heating. For this reason, when heat of fusion is referred to herein, the value given is from the first run data using the method of ASTM D 3418.

The semi-crystalline polymers used herein will have heat of fusion values of less than 50 Joules/gram, more preferably less than 30 Joules/gram, and most preferably less than 25 Joules/gram. If the crystallinity of the polyester or co-polyester is too high, there is a corresponding increase in the heat seal temperature as well as a drop off in adhesion and flexibility. Higher crystallinity polymers also become much more difficult to solvate in the appropriate solvents. Balancing all of these sometimes contradictory elements and properties can be very challenging.

The heat of fusion data on several of the useful polyesters useful in the present invention include KP 7908 (12.8 Joules/gram); KP 7915 (2.5 Joules/gram); KP 7923 (5.4 Joules/gram); and V1801 (20.4 Joules/gram). These values were obtained using the method of ASTM D 3418, but are first run values instead of the usual second run values.

The heat seal resin is also desirably soluble in common solvents. Several commercially available co-polyester resins are suitable for this application including Vitel™ 1801, Vitel™ 3550B, KP7908, KP7915, KP7923 supplied by Bostik, Inc., Dynapol™ 51402, Dynapol™ 51401, Dynapol™ 5320 supplied by Evonik Industries, Vynol™ GA 6300 and Vynol™ GA6400 by Toyobo Company, Ltd. and Skybon ES-210 supplied by SK Chemicals. The solvent is desirably ethyl acetate, or other solvents commonly used by film converters and printers such as methyl ethyl ketone, acetone, toluene, and dioxolane. On the other hand, more expensive solvents such as tetrahydrofuran, cyclohexanone, xylene, butyl acetate, methyl isobutyl ketone, or chlorinated solvents may be used if desired. The above co-polyester resins are soluble in one or more of the listed solvents.

The listed heat seal resins, however, tend to block severely unless anti-block additives are included in the mixture. Anti-block ingredients preferably include a mix of silica (e.g. Sylobloc™ 47—a silica gel antiblocking agent supplied by Grace Davison with a particle size of 5.4 to 6.6 microns, Sylysia™ 310P—a silicate supplied by Fuji Silysia Chemical Ltd. with a particle size of 1.5 to 4 microns, Lo-Vel™ 29—a synthetic amorphous precipitated silica supplied by PPG industries with a median particle size of 10 microns) and fatty amides (such as Crodamide™ ER—slip and antiblock agent supplied by Croda Polymer Additives, which is a refined erucamide with a inciting point of 79° C.; Crodamide™ BR—slip and antiblock agent supplied by Croda Polymer Additives, which is a refined behenamide with a melting point of 108° C.; or Crodamide™ 212 slip and antiblock agent supplied by Croda Polymer Additives, which is a stearyl erucamide with a melting point of 73° C.). Fatty amides act as a antiblocking agent or external lubricant which improves the flow and release properties of the coated substrate. Also, the addition of an amorphous copolyester resin having a high glass transition temperature (Tg) such as Vitel™ 2200B or Vitel™ 2700B supplied by Bostik, Inc. may be helpful to improve anti-blocking performance. Finally, it is desirable to include waxes for anti-blocking, (e.g. ACumist™ B-6—a micronized polyethylene homopolymer supplied by Honeywell with a Mettler drop point of 126° C. and a particle size of 6 to 7.5 microns; ACumist™ B-12—a micronized polyethylene homopolymer supplied by Honeywell with a Mettler drop point of 126° C. and a particle size of 4 to 17 microns; ACumist™ C-3—a micronized polyethylene homopolymer supplied by Honeywell with a Mettler drop point of 121° C. and a particle size of 3.5 to 4.2 microns; Licowax™ KPS and Licowax™ KSL—ester waxes of montanic acid with a drop point of 82° C. supplied by Clariant, or Carnauba wax supplied by Ross Waxes with a melting point of 83° C.) These waxes also act as external lubricants and improve the flow and release properties of the coated substrate.

As mentioned, a tackifying resin can be included in order to improve adhesion especially when the heat seal coating is applied to a polyethylene film. Since the tackifying resin is hard at room temperature, it can also be used as an anti-block additive. Tackifying resin usually consists of a natural or modified rosin, rosin ester, natural terpenes, styrenated terpenes and the like. Hydrocarbon resins can also be used if desired, as long as long they have sufficient aromatic or polar content to be compatible with the co-polyester. Examples of this include aromatic hydrocarbon resins, aromatic/aliphatic hydrocarbons and their partially or fully hydrogenated derivatives. The softening point of the tackifying resin should be between 80 and 140° C.

Figure 2:
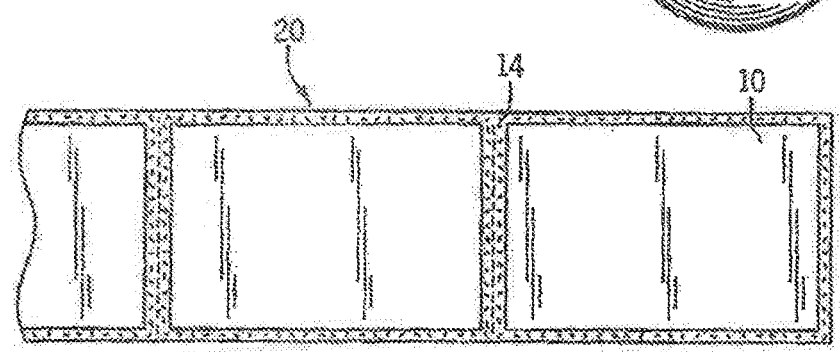
FIG. 2 is a top view of a packaging film or foil having a pattern of low-temperature heat seal coating applied to one face of the film or foil.
Figure 3:
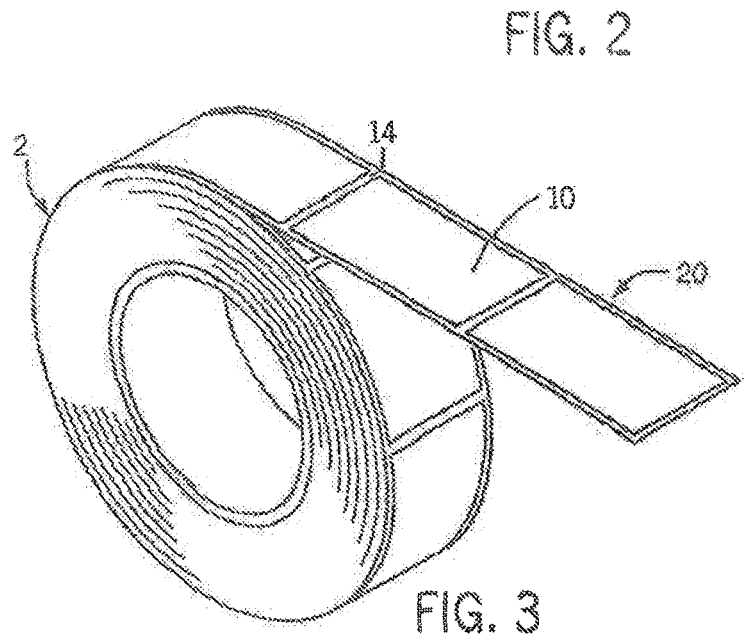
FIG. 3 illustrates the packaging film or foil shown in FIG. 2 after it has been rewound into roll form.

In accordance with the invention, it is desirable that the packaging film or foil 10 on to which the heat seal coating is applied be suitable for use in the food industry and be listed as FDA direct food compliant, e.g. 21CFR 175.320 and/or 21CFR 175.300. Referring to FIG. 1, a master roll 1 of uncoated packaging film or foil 10 is mounted on a printing press 12. The master roll 1 would normally be a 32 to 60 inches wide printed web of film or foil 10 typical for use in food packaging. The solvated heat seal mixture 14 is applied to print cylinder 16 on the printing press as is known in the art. The coating mixture 14 is printed on the web of film or foil 10 preferably in a pattern such as that shown in FIG. 2. The pattern of heat seal coating 14, see FIG. 2, desirably corresponds to the eventual location for heat seals in the resulting package. After the coating 14 is applied to the web of film or foil 10, the now coated web 20 passes through a drying oven 18, FIG. 1. It is desirable to operate the drying oven 18 such that any retained solvent in the dried coating 14 is below levels for the web 20 to be food safety compliant. The coating 14 is preferably applied to result in a minimum dry coat weight of 1.5 lbs./ream and the maximum dry coat weight of 3.5 lbs./ream A ream is defined in this case as being 3000 square feet. The co-polyesters of the type used in this invention have densities of approximately 1.3 grams/cc at room temperature. Higher coat weights can be used, but are typically not necessary and result in higher costs for the converter. The resulting coating 14 should also have a thickness at least 1.5 microns. While it is possible to coat the web of film or foil 10 with the heat seal coating 14 over its entire surface, one of the major advantages of the invention is the ability to pattern register the heat seal coating using a gravure or flexographic printing head. As further shown in FIG. 1, after the coated web 20 passes through the dryer 18, it is rewound into a finished roll 2 of now coated film or foil 20. Once the uncoated film or foil 10 fed from master roll 1 is fully passed through the printer 16 and drying station 18, the coated web 20, in the form of finished roll 2, is removed for storage as shown in FIG. 3. While the pattern of heat seal coating 14 is printed on one face of the coated web 20, the other face of the web would normally contain printed matter. Printing of the other face of the web can occur either before or after applying the heat seal coating 14.

The heat seal coating 14 is a solvent-based mixture which allows for easy handling and coating by the converter. The converter can dilute the mixture as desired to achieve the appropriate viscosity for printing and in order to achieve appropriate coat weights. Solvent choice is controlled by the exact monomer combination and by converter process, but it is most desirable that low cost and low toxicity solvents commonly used in the flexible packaging industry be used, such as ethyl acetate.

Figure 4:
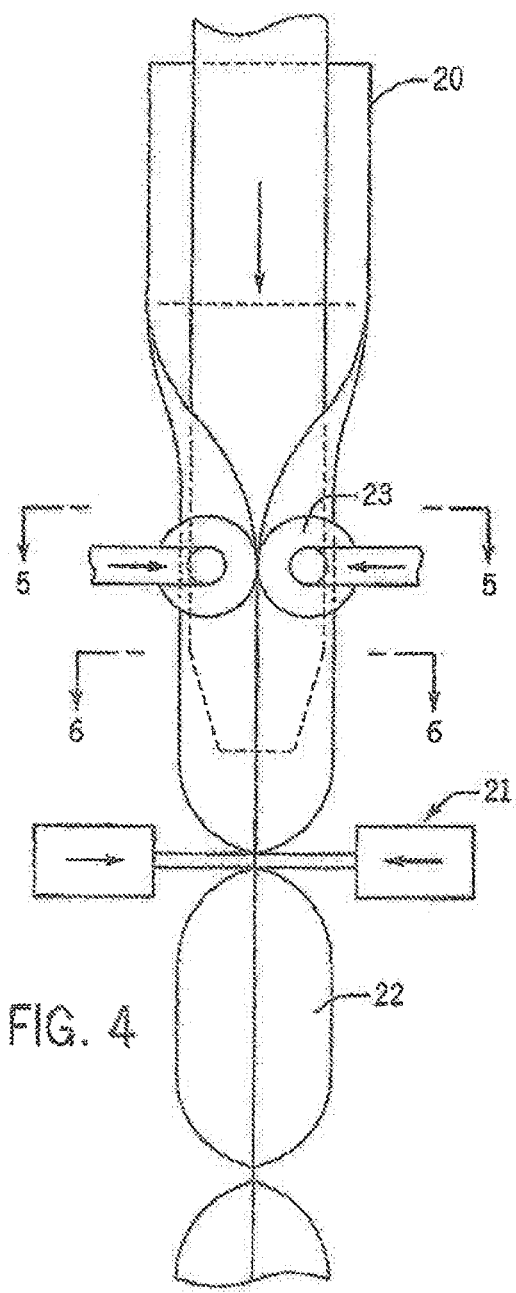
FIG. 4 is a schematic drawing illustrating the use of the film on a form, fill and seal machine.
Figure 5:
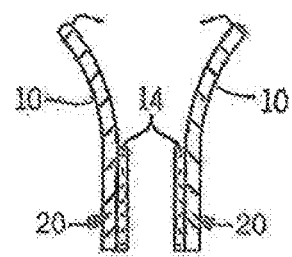
FIG. 5 is a partial section taken along line 5-5 in FIG. 4.
Figure 6:
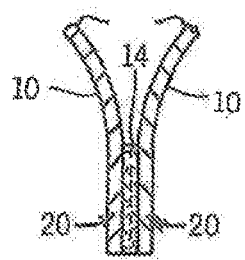
FIG. 6 is a partial section taken along line 6-6 in FIG. 4.

FIG. 4 schematically shows heat seal coated film or web 20 feeding into a vertical form, fill and seal packaging machine as is generally known in the art. Horizontal jaws 21 move heated platens together to make a horizontal seal and cut the packaged goods 22 free. Heated rollers 23 form the vertical seal for the bags 22. Goods such as potato chips or some other food item are loaded into the partially formed bags in a measured amount and then the horizontal platens 21 are closed to form the horizontal seal. As illustrated in FIG. 4, the web 20 is formed and folded so that the heat seal coated portions on the surface of the web 20 are placed face-to-face. Referring to FIG. 5, the heat seal coating 14 is located on the same face of the web 20. However, the web 20 is folded so that the heat seal coatings 14 are facing one another. Then as shown in FIG. 6, through the application of pressure and heat, the web 20 is sealed together, and the printed layer of heat seal coating 14 is sealed to itself The amorphous or semi-crystalline polyester or co-polyester heat seal resin consists of common polyester diols such as ethylene glycol, diethylene glycol, butane diol (1,4-; 1,2-; and 1,3-), neopentyl glycol, 2-methyl-1,3-propane diol, propane diol, hexane diol, trimethylolpropane, cyclohexanedimethanol and diacids such as dimethyl terephthalate, terephthalic acid, isophthalic acid, adipic acid, azelaic acid, sebacic acid, cyclohexanedicarboxylic acid, dodecanoic acid, phthalic anhydride, maleic anhydride, and hydroxycarboxylic acid such as e-caprolactone and CAPA. The resin has a glass transition temperature of from −35 to 0° C., and is a co-polyester resin with a Ring and Ball softening point of between 60 and 120° C. This resin dissolves well in ethyl acetate and other common solvents used in the converting industry. It also provides excellent anchorage to a wide range of film substrates, such as treated polypropylene (PP) and polyester (PE) which are commonly used in the packaging industry, as well as other substrates like BOPP, BOPET, PLA, aluminum foil, cellulose, etc. Anchoring of the coating to the film or foil occurs without a primer coating. As mentioned, anchorage to high surface energy substrates, e.g. polyethylene terephthalate (PET) or aluminum foil, is easily accomplished due to the polar nature of the polyester resin. To improve anchorage on lower surface energy substrates, tackifying resins can be added to the formulation. Corona treatment of the substrate will also improve the anchorage to low surface energy substrates.

The dried heat seal coating provides excellent sealability over a wide range of temperatures. Bond strength in excess of 300 gli (grams/linear inch) is provided at bond sealing temperatures as low as 70° C. The ability to provide reliable seals at such low bonding temperature allows the form, fill and seal machine to operate either at lower sealing temperatures, or at a higher packaging speeds than many competitive products and is therefore highly desirable.

The Vitel™ 1801 co-polyester resin is semi-crystalline and has a Ring and Ball softening point of about 100° C. which means that the resin has an important combination of a very low glass transition temperature (Tg) with no cold flow and a low sealing temperature. In other words, the dried heat seal coating will remain stable when it is on the roll and stored.

While Vitel™ 1801 has been identified as a desirable heat sealing resin, other co-polyester blends with similar thermal and solubility properties may be suitable for manufacture of the invention including resins containing the following polyester monomers: glycols, such as ethylene glycol, diethylene glycol, butane diol (1,4-; 1,2-; and 1,3-), neopentyl glycol, 2-methyl-1,3-propane diol, propane diol, hexane diol, trimethylolpropane, cyclohexanedimethanol and acids such as dimethyl terephthalate, terephthalic acid, isophthalic acid, adipic acid, azelaic acid, sebacic acid, cyclohexanedicarboxylic acid, dodecanoic acid, phthalic anhydride, maleic anhydride, and hydroxycarboxylic acid such as e-caprolactone and CAPA (polycaprolactone diester with diethylene glycol). The preferred polyesters and co-polyesters are manufactured from (1) terephthalic acid, (2) dimethyl terephthalate, (3) isophthalic acid, (4) sebacic acid, (5) azelaic acid, (6) ethylene glycol, (7) 1,4-butane diol, (8) caprolactone, and (9) CAPA.

Another critical step for making the product suitable to converters is to blend anti-blocking agents into the formula. Some semi-crystalline resins coated out of solution show tackiness at room temperature. To prevent blocking of the rolls, a proper combination of anti-block additives is critical to maintain the coated film's processability and heat seal bond strength. The anti-blocking additives can include silica, fatty amides, waxes, talc and tackifying resin.

The solvent based products of this invention can be manufactured using any suitable process. Generally, the pelletized co-polyester is added to the appropriate solvent in a solvent churn. After the polymer is solubilized, the other additives can be added under agitation. When the blend is complete, it is filtered and packaged in a suitable container.

In sum, the disclosed heat seal coating provides a wide processing window with respect to sealing temperatures, pressures, and dwell time. It can be applied primer free to film and foil substrates and provides high bond strength. It can be coated on the whole web or applied as pattern print by converters. For applications requiring direct and indirect food contact, all components of the heat seal selected needs to be compliant with FDA regulations.

EXAMPLES

The following examples demonstrate several aspects of certain preferred embodiments of the present invention, and are not to be construed as limitations thereof.

Example 1

Heat seal coating solution 1: Vitel 1801 (or V1801) manufactured by Bostik, Inc is a semi-crystalline copolyester resin with a Tg of −24° C. and a Ring and Ball softening point of about 100° C. A coating solution is made with 69.7% by weight of ethyl acetate, 24% of V1801 polyester resin, 3.0% of Sylvalite RE110L resin (pentaerythritol rosin ester of tall oil with a Ring and Ball softening point of 108° C. available from Arizona Chemical), 1.9% of Acumist B-6 (a polyethylene wax with a Ring and Ball softening point of 126° C.), 0.6% of Sylobloc 47 (a silica antiblock agent having a median particle size of 6 microns), 0.6% Luzenac 10M00S (a very fine pure platy talc with a median particle size of 3.8 microns supplied by Brenntag Specialties) and 0.2% Crodamide ER (an erucamide having a Ring and Ball softening point of 79° C.). The coating solution was applied to a 48 gauge PET film and 125 gauge BOPP film using a Meyer rod. The coated film is oven dried at 50° C. for 1 minute. The coating weight is measured as 1.5-3.5 lbs./ream.

Example 2

Heat seal coating solution 2: Bostik KP7923 manufactured by Bostik, Inc is an amorphous copolyester resin with a Tg of −14° C. and a Ring and Ball Softening point of about 90° C. A coating solution is made with 70% by weight of a methyl ethyl ketone/toluene blend, 22.5% of KP7923 copolyester resin, 4.0% of Piccotac™ 8595 (aliphatic/aromatic hydrocarbon resin from Eastman with a Ring and Ball softening point of 95° C.), 2.0% of ACumist B6, and 1.5% of Sylobloc 47. The coating was applied to a 48 gauge PET film using a Meyer rod. The coated film was oven dried at 50° C. for 1 minute. The coating weight is measured as 1.5-3.5 lbs./ream.

Example 3

Heat seal coating solution 3: Bostik KP7915 is an amorphous, linear saturated copolyester resin with a Tg of −15° C. and a Ring and Ball softening point about 100° C. A coating solution is made with 70% by weight of ethyl acetate, 16.7% of KP7915, 8.2% Kristalex™ 3100 (fully aromatic hydrocarbon resin from Eastman Chemical with a Ring and Ball softening point of 100° C.), 2.1% of ACumist B6, and 3.0% Sylobloc 47. The coating solution was applied to a 48 gauge PET film and 125 gauge BOPP film using a Meyer rod. The coated film is oven dried at 50° C. for 1 minute. The coating weight is measured as 1.5-3.5 lbs./ream.

Example 4

Heat seal coating solution 4: Bostik KP7908 is a semi-crystalline co-polyester resin with a Tg of −12° C. and a Ring and Ball softening point of about 110° C. A coating solution is made by mixing 70% by weight of methyl ethyl ketone, 13.5% by weight of KP7908, 14.1% of Kristalex™ 3100 hydrocarbon resin, 2.1% of ACumist B6, and 0.3% of Sylobloc 47. The coating solution was applied to a 48 gauge mil PET film using a Meyer rod. The coated film is oven dried at 50° C. for 1 minute. The coating weight is measured as 1.5-3.5 lbs./ream.

Example 5

Heat seal coating solution 5: Vitel V3550 manufactured by Bostik, Inc is an amorphous co-polyester resin with a Tg of −11° C. and a Ring and Ball softening point of about 99° C. A coating solution was made by mixing 70% by weight of ethyl acetate, 13% by weight of V3550, 12% of Kristalex™ 3100 hydrocarbon resin, 2.0% of ACumist B6, and 3.0% Sylobloc 47. The coating was applied to a 48 gauge PET film and 125 gauge BOPP film using a Meyer rod. The coated film is oven dried at 50° C. for 1 minute. The coating weight is measured as 1.5-3.5 lbs./ream.

Coefficient of Friction (COF) testing: To maintain good winding performance, a heat seal packaging film was tested for COF in an Instron Model 5982 tester following ASTM D1894 method. The COF is recorded in Table 1. The data suggests good slip property or easy to wind into a roll.

Blocking test: The blocking test was conducted in an I.C. Block Tester made by Koehler. The test sample was prepared by taking two pieces of the coated heat seal packaging film and placing them so the coated surface of one film contacted the back side (uncoated) of the other. A 40 PSI (pounds per square inch) pressure was applied to film sample. The testing sample was put into an oven at 50° C. for overnight. A peel test was conducted on the compressed samples and the peel strength values of 50 gli (grams per linear inch) or below is considered as passing, or non-blocking.

Heat seal: The heat seal was conducted on Sentinel heat-Sealer, Model 12-12AS manufactured by Packaging Industries, Montclair, N.J. Heat seal pressure is 40 PSI and the dwell. time is 1 second (ASTM F88). The heat seals were made either face to face with heat seal coating or the coating faces another different substrate. The samples were conditioned at room temperature (25° C. and 32% RH) for 24 hrs. The test samples were listed in Tables 1-5

Adhesion test: The adhesion test is conducted in Mini Tensile Tester, Theller Model D, built by H.W. Theller Inc. following ASTM D903. The testing was conducted at room temperature (25° C. and 32% RH). The peel speed is 12 in/minute. The peel strength values are listed in Tables 1-5

TABLE 1

T peel strength, blocking test, and COF for Examples 1-5 with heat seal coating on PET face to face lamination.

| Sample | Heat seal temperature | | | | Blocking test 40 psi, 50° C. PET film | COF (uncoated PET film measured at 0.29) |
|---|---|---|---|---|---|---|
| | 70° C. | 90° C. | 110° C. | 130° C. | | |
| Example 1 (V1801 resin) with 3 coat weights | | | | | | |
| 1.5 lb/ream | 218 gli | 267 gli | 348 gli | 388 gli | 2.3 gli | 0.44 |
| 2.5 lb/ream | 336 gli | 439 gli | 590 gli | 510 gli | 9.3 gli | 0.58 |
| 3.5 lb/ream | 510 gli | 755 gli | 900 gli | 950 gli | 45 gli | |
| Example 2 (KP7923 resin) with 3 coat weights | | | | | | |
| 1.5 lb/ream | 11 gli | 66 gli | 128 gli | 145 gli | 0.2 gli | |
| 2.5 lb/ream | 261 gli | 303 gli | 381 gli | 350 gli | 1.0 gli | 0.34 |
| 3.5 lb/ream | 329 gli | 399 gli | 437 gli | 407 gli | 13 gli | 0.26 |
| Example 3 (KP7915 resin) with 3 coat weights | | | | | | |
| 1.5 lb/ream | 2 gli | 63 gli | 127 gli | 140 gli | 0.7 gli | |
| 2.5 lb/ream | 93 gli | 269 gli | 291 gli | 334 gli | 1.1 gli | 0.30 |
| 3.5 lb/ream | 241 gli | 308 gli | 392 gli | 372 gli | 6.8 gli | 0.33 |
| Example 4 (KP7908 resin) with 3 coat weights | | | | | | |
| 1.5 lb/ream | 1 gli | 27 gli | 94 gli | 151 gli | 0.5 gli | |
| 2.5 lb/ream | 35 gli | 134 gli | 268 gli | 433 gli | 1.0 gli | 0.27 |
| 3.5 lb/ream | 109 gli | 207 gli | 356 gli | 448 gli | 5.7 gli | 0.33 |
| Example 5 (V3550 resin) with 3 coat weights | | | | | | |
| 1.5 lb/ream | 6 gli | 20 gli | 53 gli | 64 gli | 0.5 gli | |
| 2.5 lb/ream | 29 gli | 317 gli | 360 gli | 419 gli | 0.5 gli | 0.26 |
| 3.5 lb/ream | 106 gli | 374 gli | 439 gli | 479 gli | 3.3 gli | 0.29 |

The above data indicates that the examples embodied have good sealing characteristics even at low temperature with reasonable coat weights.

TABLE 2

T-peel strengths for Examples 1-5 with heat seal coating on BOPP face to face lamination.

| Sample | Heat seal temperature | | |
|---|---|---|---|
| | 70° C. | 90° C. | 110° C. |
| Example 1 (V1801 resin) with 3 coat weights | | | |
| 1.5 lb/ream | 122 gli | 191 gli | 316 gli |
| 2.5 lb/ream | 380 gli | 400 gli | 439 gli |
| 3.5 lb/ream | 420 gli | 530 gli | 518 gli |
| Example 3 (KP7915 resin) with 3 coat weights | | | |
| 1.5 lb/ream | 22 gli | 145 gli | 155 gli |
| 2.5 lb/ream | 173 gli | 270 gli | 252 gli |
| 3.5 lb/ream | 192 gli | 230 gli | 243 gli |
| Example 5 (V3550 resin) with 3 coat weights | | | |
| 1.5 lb/m | 2 gli | 152 gli | 175 gli |
| 2.5 lb/ream | 124 gli | 280 gli | 229 gli |
| 3.5 lb/ream | 211 gli | 327 gli | 245 gli |

This data clearly indicates that the above examples seal well when coated on a low surface energy substrate even at low temperature with reasonable coat weights.

TABLE 3

180 degree peel values for heat seal coated PET to a secondary substrate at 90° C. sealing temperature.

| Samples | Polypropylene | Polyethylene | Polyethylene terephthalate | Polystyrene |
|---|---|---|---|---|
| Example 1 (V1801) with 3 coat weights | | | | |
| 1.5 lb/ream | 56 gli | 150 gli | 145 gli | 17 gli |
| 2.5 lb/ream | 163 gli | 175 gli | 317 gli | 20 gli |
| 3.5 lb/ream | 230 gli | 280 gli | 410 gli | 88 gli |
| Example 2 (KP7923) with 3 coat weights | | | | |
| 1.5 lb/ream | 3 gli | 2 gli | 92 gli | 10 gli |
| 2.5 lb/ream | 85 gli | 75 gli | 270 gli | 30 gli |
| 3.5 lb/ream | 182 gli | 197 gli | 368 gli | 64 gli |
| Example 3 (KP7915) with 3 coat weights | | | | |
| 1.5 lb/ream | 1 gli | 2 gli | 189 gil | 23 gli |
| 2.5 lb/ream | 25 gli | 55 gli | 282 gli | 97 gli |
| 3.5 lb/rm | 95 gli | 135 gli | 329 gli | 145 gli |
| Example 4 (KP7908 resin) with 3 coat weights | | | | |
| 1.5 lb/ream | 38 gli | 10 gl | 92 gli | 11 gli |
| 2.5 lb/ream | 253 gli | 136 gli | 400 gli | 164 gli |
| 3.5 lb/ream | 340 gli | 330 gli | 420 gli | 257 gli |
| Example 5 (V3550 resin) with 3 coat weights | | | | |
| 1.5 lb/ream | 1 gli | 10 gli | 150 gli | 12 gli |
| 2.5 lb/ream | 136 gli | 30 gli | 210 gli | 110 gli |
| 3.5 lb/ream | 318 gli | 173 gli | 325 gli | 127 gli |

The data in Table 3 show that even at a low seal temperature of 90° C. there was adequate bonding performance. Sealing to PET gave the best performance.

TABLE 4

180 degree peel values for heat seal coated PET to a secondary substrates at 110° C. sealing temperature.

| Samples | Poly-propylene | Polyethylene | Polyethylene terephthalate | Polystyrene |
|---|---|---|---|---|
| Example 1 (V1801) with 3 coat weights | | | | |
| 1.5 lb/ream | 168 gli | 164 gli | 311 gli | 39 gli |
| 2.5 lb/ream | 187 gli | 202 gli | 408 gli | 68 gli |
| 3.5 lb/ream | 301 gli | 295 gli | 598 gli | 178 gli |
| Example 2 (KP7923) with 3 coat weights | | | | |
| 1.5 lb/ream | 24 gli | 18 gli | 179 gli | 20 gli |
| 2.5 lb/ream | 160 gli | 165 gli | 288 gli | 150 gli |
| 3.5 lb/ream | 267 gli | 289 gli | 451 gli | 176 gli |
| Example 3 (KP7915) with 3 coat weights | | | | |
| 1.5 lb/ream | 19 gli | 3 gli | 273 gli | 77 gli |
| 2.5 lb/ream | 103 gli | 70 gli | 378 gli | 125 gli |
| 3.5 lb/ream | 176 gli | 236 gli | 465 gli | 245 gli |
| Example 4 (KP7908 resin) with 3 coat weights | | | | |
| 1.5 lb/ream | 69 gli | 46 gli | 216 gli | 66 gli |
| 2.5 lb/ream | 371 gli | 326 gli | 397 gli | 327 gli |
| 3.5 lb/ream | 470 gli | 395 gli | 480 gli | 360 gli |
| Example 5 (V3550 resin with 3 coat weights | | | | |
| 1.5 lb/ream | 11 gli | 21 gli | 290 gli | 95 gli |
| 2.5 lb/ream | 170 gli | 255 gli | 306 gli | 167 gli |
| 3.5 lb/ream | 330 gli | 345 gli | 496 gli | 262 gli |

The data in. Table 4 show that upon increasing the sealing temperature to 110° C. from 90° C., bond strength increases and heat sealing performance improves.

TABLE 5

180 degree peel values for heat seal coated PET to a secondary substrates at 130° C. sealing temperature.

| Samples | Poly-propylene | Polyethylene | Polyethylene terephthalate | Polystyrene |
|---|---|---|---|---|
| Example 1 (V1801) with 3 coat weights | | | | |
| 1.5 lb/ream | 187 gli | 266 gli | 320 gli | 180 gli |
| 2.5 lb/ream | 245 gli | 361 gli | 490 gli | 211 gli |
| 3.5 lb/ream | 363 gli | 436 gli | 628 gli | 255 gli |
| Example 2 (KP7923) with 3 coat weights | | | | |
| 1.5 lb/ream | 15 gli | 96 gli | 154 gli | 11 gli |
| 2.5 lb/ream | 110 gli | 280 gli | 350 gli | 176 gli |
| 3.5 lb/ream | 134 gli | 411 gli | 530 gli | 215 gli |
| Example 3 (KP7915) with 3 coat weights | | | | |
| 1.5 lb/ream | 44 gli | 60 gli | 281 gli | 66 gli |
| 2.5 lb/ream | 80 gli | 275 gli | 433 gli | 260 gli |
| 3.5 lb/ream | 192 gli | 348 gli | 490 gli | 335 gli |
| Example 4 (KP7908 resin) with 3 coat weights | | | | |
| 1.5 lb/ream | 38 gli | 69 gli | 55 gli | 137 gli |
| 2.5 lb/ream | 209 gli | 319 gli | 239 gli | 270 gli |
| 3.5 lb/ream | 330 gli | 426 gli | 320 gli | 370 gli |
| Example 5 (V3550 resin) with 3 coat weights | | | | |
| 1.5 lb/ream | 75 gli | 186 gli | 323 gli | 192 gli |
| 2.5 lb/ream | 250 gli | 272 gli | 471 gli | 257 gli |
| 3.5 lb/ream | 351 gli | 460 gli | 580 gli | 291 gli |

The data in Table 5 show that upon increasing the sealing temperature to 130° C. from 110° C., bond strength values increase.

In view of the above description and data, it will be noted that the exact chemistry of the polyester or co-polyester is not the critical factor providing the advantages set forth herein. It is more important for the polyester or co-polyester to have the correct properties instead of the correct chemistry. As a result, one can synthesize polyesters and co-polyesters using numerous different monomers and numerous different techniques to result in polyesters or co-polyesters having the correct Tg and level of crystallinity. As noted herein, however, the polyester or co-polyester must have very little, if any, crystallinity to make a good adhesive. Highly crystalline polyesters and co-polyesters usually make very poor adhesives since they re-crystallize and set up very rapidly, and therefore do not properly wet out the substrate. Once these highly crystalline polyesters and co-polyesters are applied on a substrate, they also tend to shrink, which pulls the adhesive away from the substrate. These highly crystalline polyesters and co-polyesters also have poor flexibility. As a result, amorphous or semi-crystalline polyesters or co-polyesters are required to make a good adhesive. However, amorphous and semi-crystalline polyesters and co-polyesters have problems related to blocking and cold flow since they are so soft and have extremely long open times, i.e. typically measured in days or weeks. As a result, amorphous and semi-crystalline polyesters and co-polyesters must be formulated with anti-blocking agents and other additives.

DEFINITIONS

1) High Tg polyester and co-polyester resins are those resins which have a glass transition temperature of 30° C. or more as determined by differential scanning calorimetry (DSC).

2) Low Tg polyester and co-polyester resins are those resins which have a glass transition temperature lower than 30° C. and below as determined by DSC.

3) Amorphous polyester and co-polyester resins are those resins which are glassy and transparent. They do not have a definite molecular arrangement as the structure is very randomized and intertwined. Based on the glass transition temperature, they can be either tacky or brittle at room temperature. Amorphous polyester and co-polyester resins do not have any appreciable crystallinity and melting point as determined by DSC or equivalent technique and therefore have an enthalpy of fusion of 10 Joules/gram or less, preferably 5 Joules/gram or less, and most preferably zero Joules/gram.

4) Glass transition temperature (abbreviated as Tg) is defined as a second order phase transition where an amorphous material becomes glassy and brittle upon cooling and becomes soft and ductile upon heating.

5) Semi-crystalline polyester and co-polyester resins are those materials which have a well arranged crystalline phase embedded within the more random amorphous domain. The ordered crystalline sites impart the properties such as toughness and opacity to the resin. Semi-crystalline polyester and co-polyester resins have a degree of crystallinity of 30% or less as determined by DSC or equivalent technique, against a highly crystalline polypropylene standard, and a heat of fusion value of greater than 10 Joules/gram and up to 50 Joules/gram, more preferably greater than 10 Joules/gram and up to 30 Joules/gram, and most preferably greater than 10 Joules/gram and up to 25 Joules/gram.

We claim:

1. A solvated, heat seal coating mixture suitable for application onto a surface of a packaging film or foil, said mixture comprising:
   a solvent;
   a heat seal resin comprising an amorphous or semi-crystalline polyester or co-polyester with a glass transition temperature (Tg) between −35° C. and about −11° C. and a Ring and Ball Softening Point between 60° C. and 120° C., the heat seal resin being soluble in said solvent; and
   an anti-block additive.

2. A mixture as recited in claim 1 further comprising a tackifying resin.

3. A mixture as recited in claim 1 comprising:
   40% to 80% solvent by weight;
   10% to 50% heat seal resin by weight;
   0 to 30% by weight tackifying resin; and
   0.1% to 20% by weight anti-block additives.

4. A mixture as recited in claim 1 wherein the solvent comprises ethyl acetate.

5. A mixture as recited in claim 2 comprising:
   60% to 80% solvent by weight;
   10% to 30% heat seal resin by weight;
   1% to 20% tackifying resin by weight;
   0.1% to 10% anti-block additives.

6. A mixture as recited in claim 1 wherein the heat seal resin is an amorphous or semi-crystalline polyester comprising one or more of the following glycols: ethylene glycol, diethylene glycol, butane diol (1,4-; 1,2-; and 1,3-), neopentyl glycol, 2-methyl-1,3-propane diol, hexane diol, trimethylolpropane, and cyclohexanedimethanol; and one or more of the following acids: dimethyl terephthalate, terephthalic acid, isophthalic acid, adipic acid, azelaic acid, sebacic acid, cyclohexanedicarboxylic acid, and hydroxycarboxylic acid.

7. A mixture as recited in claim 2 wherein the tackifying resin comprises natural or modified rosin, rosin esters, natural terpenes, styrenated terpenes, aromatic hydrocarbon resins, aromaticlaliphatic hydrocarbons and their partially or fully hydrogenated derivatives.

8. A mixture as recited in claim 1 wherein the heat seal resin comprises ethylene glycol, terephthalic acid, and sebacic acid.

9. A mixture as recited in claim 1 wherein the heat seal coating anchors to packaging films or foils made of polyester, polypropylene, polyvinyl chloride, treated biaxially oriented polypropylene, biaxially oriented polyethylene, polylactic acid, cellulose, metal foils without requiring that a primer be applied to the surface of the film or foil before applying the solvent based mixture to the surface of the film or foil and drying the mixture to form the heat sealable coating on the surface of the film or foil.

10. A mixture as recited in claim 1 wherein the anti-block additives comprise silica, fatty amides, talc, wax, ester waxes and mixtures thereof.

11. A mixture as recited in claim 10 wherein the anti-block additives comprise said wax and said wax includes paraffin, microcrystalline, polyethylene, polypropylene, or naturally derived wax.

12. A mixture as recited in claim 1 wherein said heat seal resin is an amorphous polyester or co-polyester having a heat of fusion value of 10 Joules/gram or less.

13. A mixture as recited in claim 1 wherein said heat seal resin is a semi-crystalline polyester or co-polyester having a heat of fusion value greater than 10 Joules/gram and up to 50 Joules/gram.

14. A heat seal coated packaging web, said packaging web comprising:
    a packaging web comprising a film or foil having two surfaces;
    a solvent-based, heat seal coating applied and dried onto one surface of the packaging web, the heat seal coating comprising:
    a solvent;
    an amorphous or semi-crystalline polyester or co-polyester with a glass transition temperature (Tg) between −35° C. and about −11° C. and a Ring and Ball softening point of between 60° C. and 120° C.; and
    an anti-block additive.

15. A heat seal coated packaging web as recited in claim 14 wherein the heat seal coating further comprises a tackifying resin.

16. A heat seal coated packaging web as recited in claim 14 wherein the solvent-based, heat seal coating applied to one surface of the packaging web contains the following constituents in wet form: 40-80% by weight solvent; 10-50% by weight heat seal resin; 0-30% by weight tackifying resin; and 0.1-20% by weight anti-block additives.

17. A heat seal coated packaging web as recited in claim 14 wherein the packaging web is made of one or more of the following materials: polyester, polypropylene, nylon, polyvinyl chloride, metal foil or a combination thereof.

18. A heat seal coated packaging web as recited in claim 14 wherein the heat seal coating is applied in a pattern on the surface of the packaging web.

19. A heat seal coated packaging web as recited in claim 14 wherein the packaging web is provided in roll form.

20. A heat seal coated packaging web as recited in claim 14 wherein the packaging web is made of corona-treated polypropylene.

21. A heat seal coated packaging web as recited in claim 14 wherein the surface of the packaging web on which the heat seal coating is not applied contains printed matter.

22. A heat seal coated packaging web as recited in claim 14 wherein the heat seal coating has a thickness of at least about 1.5 microns in dry form.

23. A heat seal coated packaging web as recited in claim 14 wherein said heat seal resin is an amorphous polyester or co-polyester having a heat of fusion value of 10 Joules/gram or less.

24. A heat seal coated packaging web as recited in claim 14 wherein said heat seal resin is a semi-crystalline polyester or co-polyester having a heat of fusion value greater than 10 Joules/gram and up to 50 Joules/gram.

25. A method of applying a heat seal coating to a packaging substrate web comprising the steps of:
supplying a roll of a packaging web comprising a film or foil to a printing press;
using the printing press to print a wet solvent-based heat seal coating onto one surface of the packaging web, said solvent-based heat seal coating comprising: a solvent; a heat seal resin comprising an amorphous or semi-crystalline polyester or co-polyester with a glass transition temperature between −35° C. and about −11° C. and a Ring and Ball softening point of between 60° C. and 120° C., and; an anti-block additive;
drying the wet solvent-based, heat seal coating to remove solvent and leave a dry solid layer of heat seal coating on the surface of the packaging web; and
rewinding the coated and dried packaging web into roll form.

26. A method as recited in claim 25 wherein the packaging web comprises polypropylene film and the method further comprises the step of treating the polypropylene film via corona discharge prior to applying the solvent-based heat seal coating onto the film.

27. A method as recited in claim 25 wherein said heat seal resin is an amorphous polyester or co-polyester having a heat of fusion value of 10 Joules/gram or less.

28. A method as recited in claim 25 wherein said heat seal resin is a semi-crystalline polyester or co-polyester having a heat of fusion value greater than 10 Joules/gram and up to 50 Joules/gram.

29. A method as recited in claim 25 wherein the packaging web is made of one or more of the following materials: polyester, polypropylene, nylon, polyvinyl chloride, metal foil or a combination thereof.

30. A method as recited in claim 25 wherein the heat seal coating is applied in a pattern on the surface of the packaging web.

31. A method as recited in claim 25 wherein the packaging web is provided in roll form.

32. A method as recited in claim 25 wherein the packaging web is made of corona-treated polypropylene.

33. A method as recited in claim 25 wherein the surface of the packaging web on which the heat seal coating is not applied contains printed matter.

34. A method as recited in claim 25 wherein the heat seal coating has a thickness of at least about 1.5 microns in dry form.

35. A solvated, heat seal coating mixture suitable for application onto a surface of a packaging film or foil, said mixture comprising:
a solvent;
a heat seal resin comprising an amorphous or semi-crystalline polyester or co-polyester with a glass transition temperature (Tg) between −35° C. and about −11° C. and a Ring and Ball Softening Point between 80° C. and 115° C., the heat seal resin being soluble in said solvent; and
an anti-block additive;
wherein said mixture when coated on a packaging film or foil and dried to form a heat sealable coating enables heat sealing of coated surfaces face-to-face on a form, fill and seal machine at a sealing temperature as low as 70° C.

36. A mixture as recited in claim 35 wherein the Ring and Ball Softening Point of the polyester or co-polyester is between about 90° C. and about 110° C.

37. A mixture as recited in claim 36 wherein heat seal resin is an amorphous polyester or co-polyester having a heat of fusion value of 10 Joules/gram or less.

38. A mixture as recited in claim 37 wherein heat seal resin is an amorphous polyester or co-polyester having a heat of fusion value of 5 Joules/gram or less.

39. A mixture as recited in claim 35 wherein the glass transition temperature (Tg) of the amorphous or semi-crystalline polyester or co-polyester is between −30° C., and about −11° C.

40. A mixture as recited in claim 39 wherein the glass transition temperature (Tg) of the amorphous or semi-crystalline polyester or co-polyester is between −24° C. and about −11° C.

41. A mixture as recited in claim 1, wherein the solvent is selected from the group consisting of at least one of ethyl acetate, methyl ethyl ketone, acetone, dioxalane, toluene, tetrahydrofuran, cyclohexanone, xylene, butyl acetate, and methyl isobutyl ketone.

42. A mixture as recited in claim 1, wherein the solvent comprises a chlorinated solvent.

43. A heat seal coated packaging web as recited in claim 14, wherein the packaging web is suitable for a form, fill and seal machine and is able to heat seal at a temperature as low as 70° C. with a seal strength of at least 300 grams/linear inch.

\* \* \* \* \*